June 10, 1930.                A. Y. DODGE                1,762,714
                              BRAKE CONTROL
                          Filed Dec. 31, 1924         2 Sheets-Sheet 1

Witness
Martin H. Olsen

Inventor
Adiel Y. Dodge

June 10, 1930.　　　A. Y. DODGE　　　1,762,714
BRAKE CONTROL
Filed Dec. 31, 1924　　　2 Sheets-Sheet 2

Witness
Martin H. Olsen.

Inventor
Adiel Y. Dodge
By Cromwell, Greist, Warder
Atty's

Patented June 10, 1930

1,762,714

UNITED STATES PATENT OFFICE

ADIEL Y. DODGE, OF SOUTH BEND, INDIANA, ASSIGNOR TO PERROT BRAKE CORPORATION, OF SOUTH BEND, INDIANA, A CORPORATION OF ILLINOIS

BRAKE CONTROL

Application filed December 31, 1924. Serial No. 758,980.

The invention has for its object the provision of an improved front wheel brake control in the form of a light, durable and inexpensive single lever coupling between the brake and the adjacent brake actuating means.

The foregoing statement is indicative in a general way of the nature of the invention, but other objects and advantages contemplated will be evident to those skilled in the art upon a full understanding of the construction, arrangement and operation of the lever coupling.

A preferred embodiment of the invention is presented in the accompanying drawings and in the following detailed description predicated thereon, but such embodiment obviously is susceptible of modification without sacrifice of the spirit of the invention and without departure from the scope of the claims.

Figure 1:
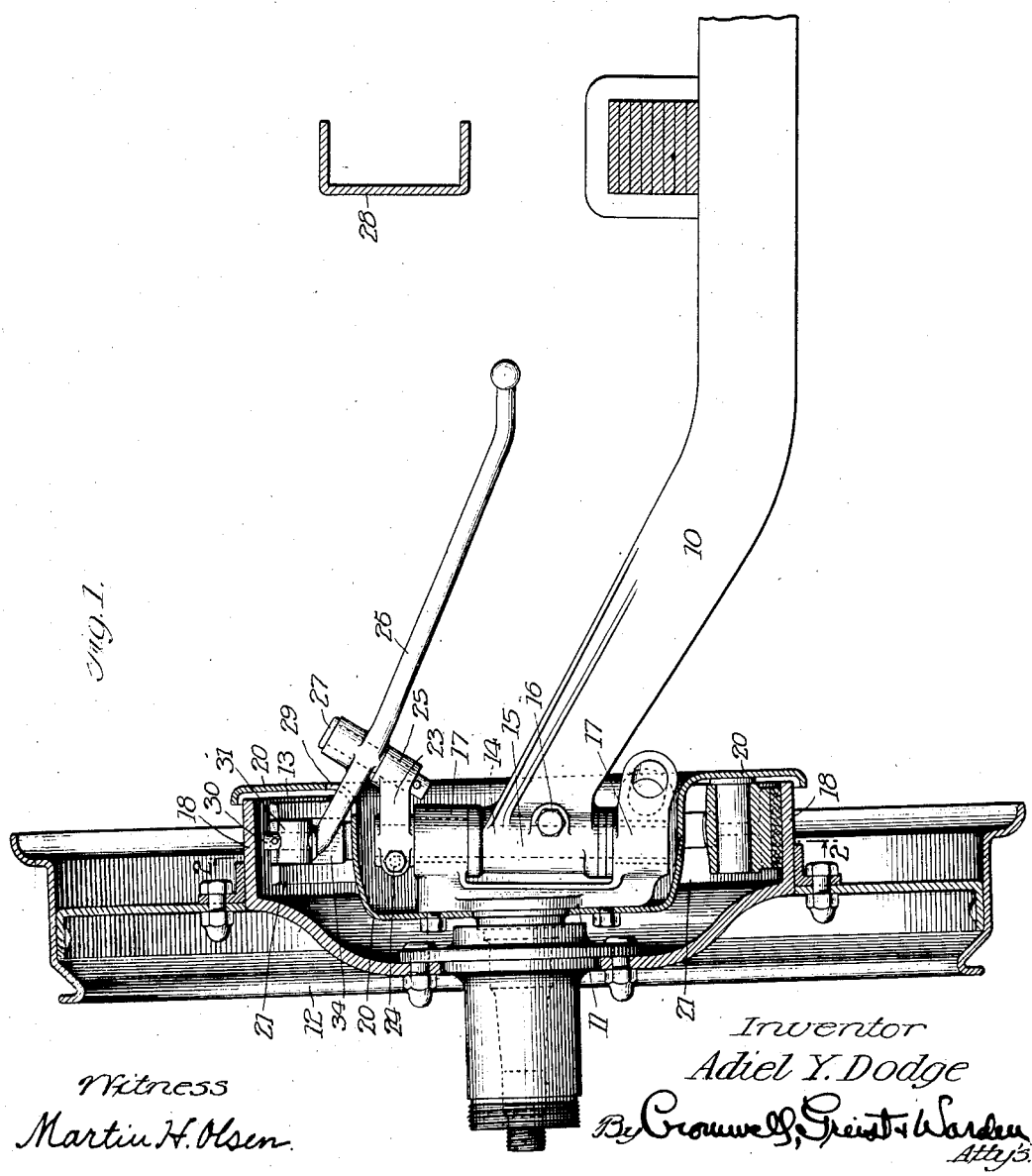
Fig. 1 is a vertical section taken through a front wheel brake assembly equipped with the lever coupling of the invention.
Figure 2:
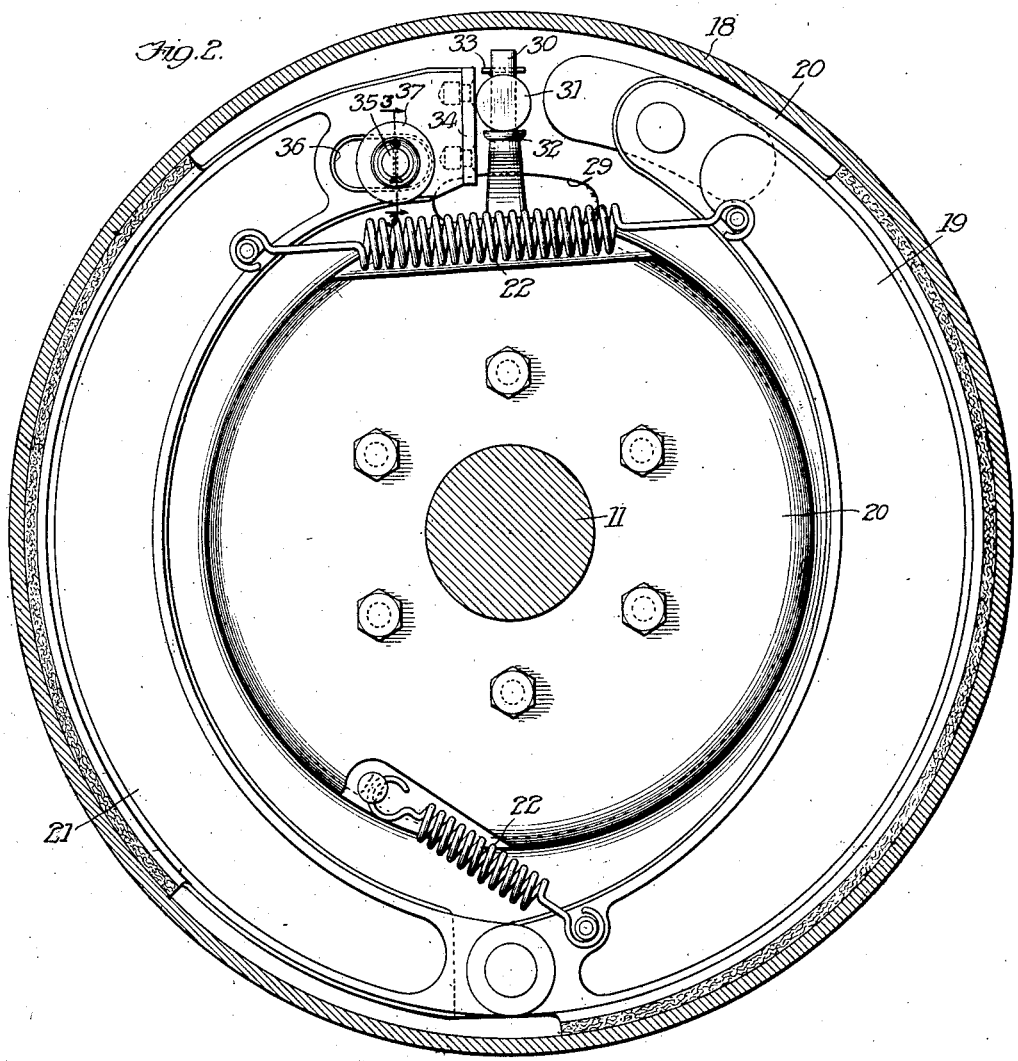
Fig. 2 is a vertical section taken on the line 2—2 of Fig. 1.
Figure 3:
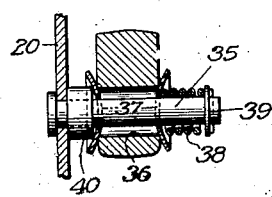
Fig. 3 is a vertical section taken on the line 3—3 of Fig. 2.

The front wheel brake assembly illustrated in the drawings includes an axle 10, a spindle 11 pivotally connected with the axle, a wheel 12 journaled on the spindle, and a brake 13 acting between the wheel and the spindle. The pivotal connection between the axle 10 and the spindle 11 is effected in the usual manner by means of a pin 14 which is secured in an apertured butt 15 of the axle by a transverse locking bolt 16 or other standard method, and extends through two apertured butts 17 of the spindle. The brake 13 may be of any approved construction, but preferably consists of a drum 18 carried by the wheel 12, a shoe 19 pivoted at one end to an anchor plate 20 carried by the spindle 11, another shoe 21 pivoted at one end to the free end of the shoe 19, and a plurality of suitably arranged springs 22 tending to hold the shoes normally in a contracted position away from the drum and against the anchor plate. The median plane of movement of the brake preferably intersects with the axis of the pin 14 at the axis of the wheel 12.

The invention resides in the hereinafter described controlling device for the brake.

A bracket 23 is detachably secured to the upper end of the pin 14 above the upper butt 17 of the spindle 11, and is fixedly positioned with respect to the pin 14 by a transverse locking bolt 24 or other suitable means. The bracket 23 extends laterally from the pin 14, and terminates in an apertured end portion 25 which is inclined to the pin 14. An inclined lever 26 is fulcrumed intermediate its ends upon the portion 25 of the bracket 23 by means of a pin 27. One end of the lever 26 extends toward the chassis frame 28 of the vehicle and connects with the usual brake operating rod (not shown), and the other end of the lever extends through a slot 29 in the anchor plate 20 to a point adjacent the free end of the shoe 21 intersecting the median plane of movement of the brake at the center line of the pin 14, where it turns upwardly in the form of a cylindrical stem 30.

A bearing member 31 of preferably cylindrical form is movably carried in a horizontal position by the stem 30 of the lever 26, and is provided with a transverse aperture for the reception of the stem. Any suitable means, such as a shoulder 32 on the stem 30 and a removable cotter 33 through the stem, may be employed for maintaining the bearing member 31 in position upon the stem. The front horizontally elongated face of the member 31 bears against a plate 34 which is secured to the adjacent free end of the shoe 21. The upper free end of the shoe 21 is maintained at all times in proper relation to the plane of the anchor plate 20 by means of a pin 35 which projects from the anchor plate and passes through an elongated slot 36 in the free end of the shoe 21. The slot 36 is considerably wider than the diameter of the pin 35 in order not to obstruct the compound movement of the shoe, and the slot is normally centered relative to the pin by means of two dished and centrally apertured washers 37 positioned at the ends of the slot. A helical spring 38 is compressed between one of the washers and a removable abutment 39 on the projecting end of the pin 35, and tends both to press the slotted portion of the shoe 21 toward the anchor plate 20 against a limiting shoulder 40 on the pin 35, and to contract the washers 37 to center the slot relative to the pin.

When the lever 26 is oscillated to move the articulated shoes 19 and 21 into frictional engagement with the drum 18, the stem 30 of the lever will bear continuously in line contact against the member 31, and the member 31 will in turn bear continuously in line contact against the plate 34 on the shoe 21.

It will be appreciated from the foregoing description that the lever coupling of the invention constitutes an extremely light, durable and inexpensive brake control which may be readily incorporated in a front wheel brake assembly of any standard type. The wheel body and brake drum structure disclosed in the drawings forms no part of this invention, the same constituting the subject-matter of Patent No. 1,652,752, dated December 13, 1927, granted to Motor Industries, Inc., on an application of Vincent Bendix.

I claim:

1. A vehicle having a wheel with a brake, an axle, a wheel-carrying spindle supporting part of the brake, and a pivot pin swivelling the spindle to one end of the axle, and comprising, in combination with said parts, a lever generally paralleling the axis and fulcrummed on the opposite side of the pivot pin from the wheel and having its wheel end turned vertically upward and substantially coaxial with respect to the pivot pin when the brake is applied, and an elongated thrust member having a cylindrical face with horizontally extending elements engaging the brake and having a vertical bore embracing the vertically-turned end of the lever.

2. In a wheel brake assembly, a brake drum, a friction device co-acting with the drum, actuating means therefor comprising a cylindrical member the axis of which extends substantially parallel to the axis of the drum, and means for forcing said cylinder into contact with one end of said friction device, said means constructed and arranged to impart a translatory motion to said cylindrical member.

In testimony whereof I have hereunto subscribed my name.

ADIEL Y. DODGE.